3,397,610
PREPRINTED NEWSPRINT WEB REGISTER DEVICE

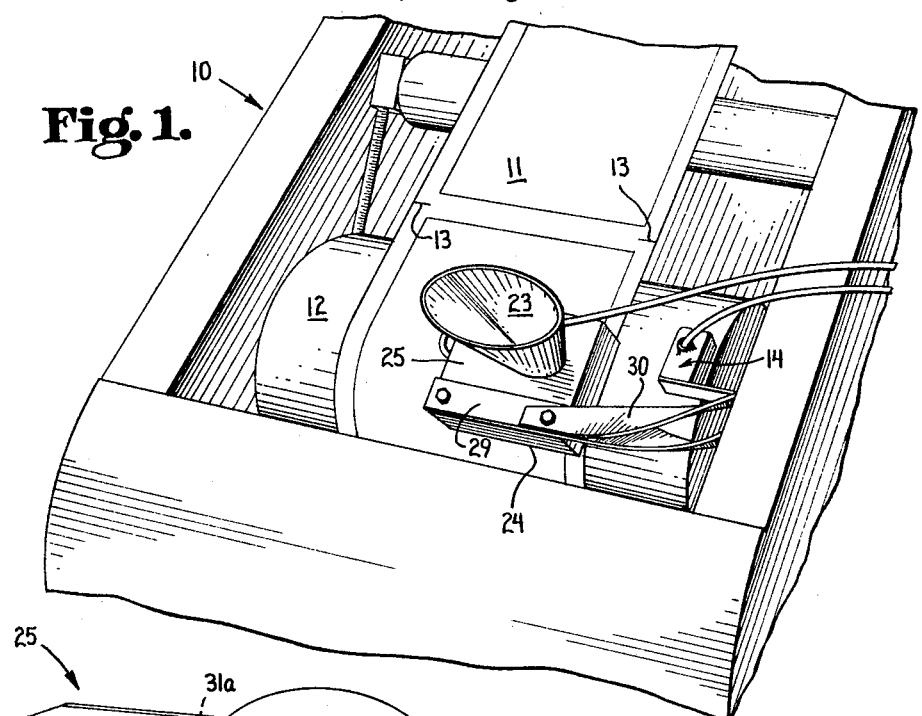
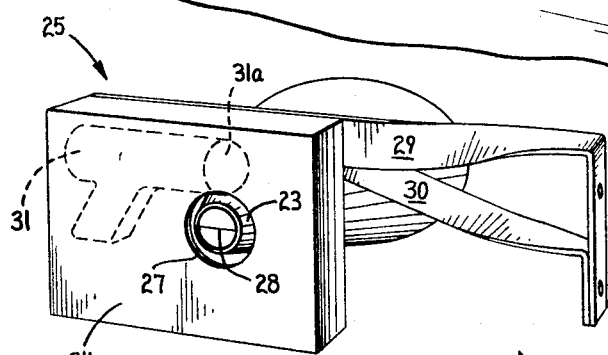
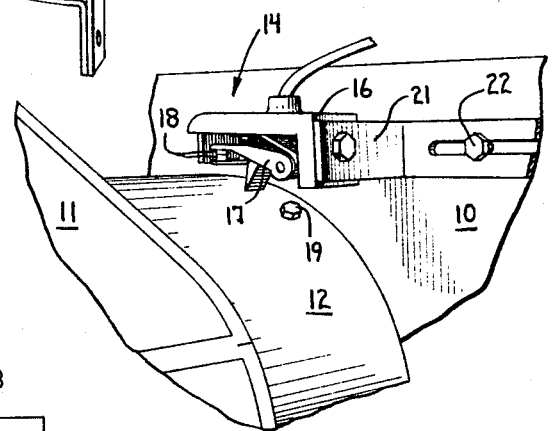
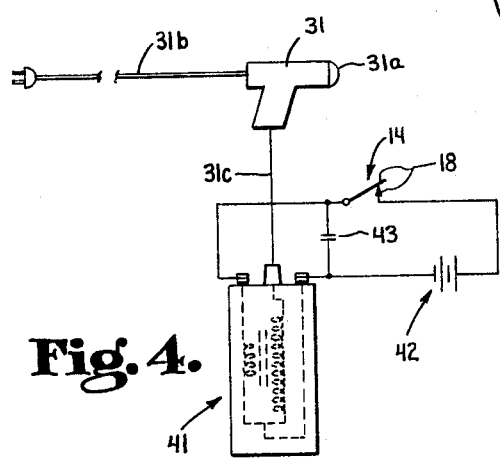

Albert E. Meier, Muncie, Ind., assignor of one-half to Muncie Newspapers, Inc., Muncie, Ind., a corporation of Indiana
Filed Aug. 5, 1965, Ser. No. 477,488
3 Claims. (Cl. 88—14)

This invention relates generally to rotary press printing operations and in particular to a device for indicating an out-of-register or synchronism condition with respect to folding machinery for a preprinted newsprint web passing through a rotary press.

Modern newsprinting facilities often utilize preprinted newprint, often multicolor, on high quality paper, the preprinting usually taking the form of national advertising for mass-market consumer items. One preprinted newsprint web of the type referred to is commercially marketed to newspapers under the trademark "Specta Color." Such preprinted material is provided with break lines along the side margins of the web. The break marks are spaced from each other along the web to indicate the proper line for separating or cutting off the web so as to provide pages of the proper length each carrying the complete advertising for a single page, rather than only nonmatched portions of the advertising material which repeats itself sequentially along the web.

It is the primary object of the present invention to provide an apparatus giving a visual indication of the position of the break lines on a preprinted web as the web moves a high speed rotary press.

A further object of the present invention is to provide an apparatus which achieves the function referred to above but which is relatively simple and inexpensive.

The apparatus includes a scanning member mounted over the newsprint web and placed so as to view, by means of a scanning tube, the break lines passing beneath it as the press operates. The view through the scanning tube encompasses a cross-hair or reference line extending across the tube. A source of illumination for the field viewed by the scanning tube is provided and this source of illumination is energized momentarily with each revolution of the impression cylinder of the press. A stroboscopic viewing effect is thus produced which "stops" the moving break lines and gives a visual comparison of their position with respect to the scanning tube reference line. If, as indicated by the view through the scanning tube, the break lines appear to drift away from the reference line, the press operator can manually adjust the speed of the press so as to bring the break lines on the moving web back into close register with the reference line thereby providing the proper feed of the web to the folding and cutting machinery and assuring that the preprinted material is properly oriented in the finished newspaper.

FIG. 1 is a perspective view of the device of the present invention mounted upon a rotary press.

FIG. 2 is a fragmentary, perspective view of the control means for the device of the present invention.

FIG. 3 is a perspective view taken generally from the bottom or undersurface of the device of the present invention.

FIG. 4 is a schematic illustration of the electrical circuit for the device of the present invention.

Referring initially to FIGS. 1 and 2, there is generally indicated at 10, as environment for the device of the present invention, a conventional rotary press carrying a preprinted newsprint web 11. The web 11 extends over an impression roll 12 on the press and is provided with break lines 13 spaced along the marginal edges of the web and dividing the web into conventional newspaper length pages. The break lines 13, as previously mentioned, indicate the proper cutting lines for the web, the cutting being carried out in folding and cutting machinery (not shown) which receives the newsprint after its excursion through the impression and plate cylinders.

As may best be seen in FIG. 2 the control means, indicated at 14, for the device of the present invention includes a housing 16 carrying a conventional automotive breaker arm 17 and contacts 18. The breaker arm is engaged by a stud 19 which is threaded into an aperture in the impression roll 12. As the roll 12 revolves, once in each revolution the stud 19 raises the breaker arm 17 to separate the breaker points or contacts 18. The housing 16 is mounted upon a bracket 21 which, in turn, is bolted as indicated at 22, to an adjacent, stationary portion of the press.

Referring now primarily to FIGS. 1 and 3, the device of the present invention, in addition to the control means, includes a sighting or scanning tube 23 mounted over the moving web 11 so as to scan one side marginal portion of the web, that is, a portion of the web carrying break lines 13. A housing, of generally rectangular configuration, and identified at 25 is attached to the tube 23 intermediate its ends. As may best be seen in FIG. 3, the tube 23 extends through the housing to the housing wall 24 which, when the device is mounted as shown in FIG. 1, is nearest the moving web 11. The wall 24 of the housing is provided with an aperture 27 which accommodates the adjacent end of the scanning tube 23 and which is sized to provide an annular gap between the tube and the aperture margin. Brackets 29 and 30 (FIG. 1), bolted to an adjacent stationary portion of the press serve to support the housing in overlying relation to the web.

As may best be seen in FIG. 3, a sighting member 28 extends across the interior of the tube 23 parallel to the break lines passing beneath the sighting element as the web moves in the press.

As indicated in FIGS. 3 and 4, mounted within the housing 25 is an illuminating means taking the form of the lamp assembly 31. The lamp assembly 31 is of conventional type having a lens covered aperture 31a which, when the timing light is energized, transmits light to the interior of the housing 25. The illuminating means taking the form of the lamp assembly 31 is of the stroboscopic type having a conventional 110 volt AC input cord 31b (FIG. 4) and a control lead 31c (FIG. 4). A voltage pulse at the control lead 31c causes energization of the light assembly. As will be evident from FIG. 3, there is an annular gap between the tube 23 and the margin of the aperture 27 and this gap serves to permit transmission of light from the illuminating means 31 to the break line area of the moving web of newsprint located just below the housing wall 24.

The electrical circuit for the device of the present invention is indicated schematically at FIG. 4. A conventional 6 volt DC spark coil 41 is connected in conventional fashion to a 6 volt source of DC power such as a battery indicated at 42. The conventional condenser 43 is connected across the input leads to the spark coil 41 and the breaker points 18 are connected, as indicated in FIG. 4, in circuit with the battery and the spark coil.

In operation, with the press moving the web 11 beneath the lower end of the tube 23, the break lines 13 on the web will pass beneath the stationary reference mark formed by the sighting member 28 in the tube. The stud 19 on the impression cylinder will actuate the breaker contacts 18 upon each revolution of the impression cylinder and the illuminating means 31 will flash momentarily. Because of the stroboscopic effect thus produced, a viewer at the open, upper end of the scanning tube 23 will perceive the break lines 13 as in substantially immobile aligned relation with the member 28 if the speed of the press is such as to maintain the preprinted newsprint web in proper synchronization for feeding into the folding and cutting apparatus. If the speed of the press is too high or too low for proper synchronization of the moving web, the break lines will appear to be displaced from the member 28 when viewed through the scanning tube 23. In the event that an adjustment of the press speed is thus indicated, the operator can then make manual adjustment of the conventional tension control regulator valve on the press. This adjustment will "move" the break lines back into general alignment with the member 28 in the scanning tube, assuring that the newsprint web will be fed into the cutting and folding apparatus properly.

While the invention has been disclosed and described in some detail in the drawings and foregoing description, they are to be considered as illustrative and not restrictive in character, as other modifications may readily suggest themselves to persons skilled in this art and within the broad scope of the invention, reference being made to the appended claims.

What is claimed is:

1. An apparatus for use with a rotary press to give a visual indication of the positional alignment with relation to a stationary reference mark of break lines spaced along a moving web of newsprint in the press, said means comprising a scanning tube mounted over the moving web so as to scan the web area carrying the break lines, a sighting member extending across the interior of the tube parallel to the break lines passing beneath it on the press, a housing attached to said tube with the tube extending through the housing to the housing wall nearest the moving web, an illuminating means within the housing adapted to be energized upon receipt of an electrical signal pulse from a control means, said control means including an element actuated with each revolution of the press impression cylinder to provide the electrical signal pulse, said housing wall nearest the moving web having an aperture therein accommodating the adjacent end of said scanning tube and sized to provide an annular gap between the tube and the aperture margin for transmission of light from the illuminating means to the moving web, whereby the break line area of the moving web is intermittently illuminated to provide a stroboscopic visual indication in the scanning tube of the positional alignment of successively appearing break lines with the scanning tube sighting member.

2. An apparatus for use with a rotary press to give a visual indication of the positional alignment with relation to a stationary reference mark of break lines spaced along a moving web of newsprint in the press, said means comprising a scanning tube mounted over the moving web so as to scan the web area carrying the break lines, a sighting member extending across the interior of the tube parallel to the break lines passing beneath it on the press, a housing attached to said tube with the tube extending through the housing to the housing wall nearest the moving web, an illuminating means within the housing adapted to be energized upon receipt of an electrical signal pulse from a control means, said control means including an element actuated intermittently at a frequency corresponding to the velocity of the moving web to provide the electrical signal pulse, said housing wall nearest the moving web having an aperture therein accommodating the adjacent end of said scanning tube and sized to provide an annular gap between the tube and the aperture margin for transmission of light from the illuminating means to the moving web, whereby the break line area of the moving web is intermittently illuminated to provide a stroboscopic visual indication in the scanning tube of the positional alignment of successively appearing break lines with the scanning tube sighting member.

3. An apparatus for use with a rotary press to give a visual indication of the positional alignment with relation to a stationary reference mark of break lines spaced along a moving web of newsprint in the press, said means comprising a scanning tube mounted over the moving web so as to scan the web area carrying the break lines, a sighting member extending across the interior of the tube parallel to the break lines passing beneath it on the press, a housing attached to said tube with the tube extending through the housing to the housing wall nearest the moving web, an illuminating means within the housing adapted to be energized upon receipt of an electrical signal pulse from a control means, said control means including an element actuated intermittently at a frequency corresponding to the velocity of the moving web to provide the electrical signal pulse, said housing wall nearest the moving web having an aperture therein accommodating the adjacent end of said scanning tube and having a configuration providing a gap between the tube and the aperture margin for transmission of light from the illuminating means to the moving web, whereby the break line area of the moving web is intermittently illuminated to provide a stroboscopic visual indication in the scanning tube of the positional alignment of successively appearing break lines with the scanning tube sighting member.

References Cited

UNITED STATES PATENTS 2,181,879   12/1939   Edgerton _____ 88—14 XR

JEWELL H. PEDERSEN, *Primary Examiner.*

O. B. CHEW, *Assistant Examiner.*